(12) United States Patent  (10) Patent No.: US 8,068,199 B2
Ishitani  (45) Date of Patent: Nov. 29, 2011

(54) LIQUID CRYSTAL DISPLAY DEVICE

(75) Inventor: Tetsuji Ishitani, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 12/774,961

(22) Filed: May 6, 2010

(65) Prior Publication Data

US 2010/0214516 A1  Aug. 26, 2010

Related U.S. Application Data

(63) Continuation of application No. 11/246,266, filed on Oct. 11, 2005, now Pat. No. 7,733,448.

(30) Foreign Application Priority Data

Oct. 29, 2004 (JP) ................................. 2004-315892

(51) Int. Cl.
*G02F 1/1335* (2006.01)
(52) U.S. Cl. ........................................................ 349/117
(58) Field of Classification Search .................. 349/117, 349/43, 119, 179, 172, 174, 86, 123, 113, 349/114, 138, 183, 185
See application file for complete search history.

(56) References Cited

U.S. PATENT DOCUMENTS

| | | | |
|---|---|---|---|
| 5,583,679 A | 12/1996 | Ito et al. | |
| 5,710,609 A | 1/1998 | Shimada | |
| 5,798,744 A * | 8/1998 | Tanaka et al. | 345/92 |
| 6,005,651 A * | 12/1999 | Takahara et al. | 349/137 |
| 6,014,194 A | 1/2000 | Kuo et al. | |
| 6,183,822 B1 * | 2/2001 | Farrand et al. | 428/1.1 |
| 6,300,988 B1 * | 10/2001 | Ishihara et al. | 349/43 |
| 6,346,974 B1 | 2/2002 | Itou et al. | |
| 6,452,651 B1 * | 9/2002 | Takami et al. | 349/88 |
| 7,090,901 B2 | 8/2006 | Chien et al. | |

(Continued)

FOREIGN PATENT DOCUMENTS

JP  05-273544  10/1993

(Continued)

OTHER PUBLICATIONS

B.M.I. van der Zande, et al., "Technologies Towards Patterned Optical Foils", SID 03 Digest, pp. 194-197.

(Continued)

*Primary Examiner* — Thoi Duong
(74) *Attorney, Agent, or Firm* — Nixon Peabody LLP; Jeffrey L. Costellia

(57) ABSTRACT

It is an object of the present invention to provide a method for manufacturing a thin phase difference film of a liquid crystal display easily so as not to prevent a liquid crystal from being driven so that cost for manufacturing a liquid crystal display is more reduced than conventionally. A liquid crystal display device according to the present invention has a structure in which phase difference films that have the same function as a conventional phase difference film are formed by using a liquid crystal stabilized with a polymer over a first substrate and a second substrate that have electrodes formed thereover, and a liquid crystal material is interposed between these substrates. In addition to the structure as described above, it is also a feature that the phase difference film formed over the substrate is formed by using a liquid crystal that is stabilized with a polymer including a conductive material.

29 Claims, 12 Drawing Sheets

U.S. PATENT DOCUMENTS

| | | |
|---|---|---|
| 7,327,433 B2 | 2/2008 | Miyachi et al. |
| 7,342,623 B2 * | 3/2008 | Ishizaki ................... 349/114 |
| 7,342,632 B2 | 3/2008 | Miyachi et al. |
| 7,495,729 B2 | 2/2009 | Moriya |
| 7,576,829 B2 | 8/2009 | Kikuchi et al. |
| 7,623,207 B2 * | 11/2009 | Lyu ................... 349/117 |
| 7,843,540 B2 | 11/2010 | Ozawa et al. |
| 2002/0024621 A1 | 2/2002 | Hirakata et al. |
| 2003/0062519 A1 | 4/2003 | Yamazaki et al. |
| 2004/0156001 A1 | 8/2004 | Moriya |
| 2005/0045729 A1 | 3/2005 | Yamazaki |
| 2005/0127820 A1 | 6/2005 | Yamazaki et al. |
| 2006/0203147 A1 | 9/2006 | Chen et al. |
| 2006/0227283 A1 | 10/2006 | Ooi et al. |
| 2009/0153761 A1 | 6/2009 | Park et al. |
| 2009/0322997 A1 | 12/2009 | Kaihoko et al. |
| 2010/0165280 A1 | 7/2010 | Ishitani et al. |
| 2010/0195028 A1 | 8/2010 | Kubota et al. |
| 2010/0245724 A1 | 9/2010 | Nishi et al. |

FOREIGN PATENT DOCUMENTS

| | | |
|---|---|---|
| JP | 07-306318 | 11/1995 |
| JP | 08-050206 | 2/1996 |
| JP | 11-258638 | 9/1999 |
| JP | 2000-137226 | 5/2000 |
| JP | 2003-327966 | 11/2003 |
| JP | 2004-145327 | 5/2004 |
| JP | 2004-151310 | 5/2004 |
| JP | 2004-240102 | 8/2004 |
| JP | 2005-003733 | 1/2005 |
| JP | 2007-171938 | 7/2007 |
| JP | 2008-112022 | 5/2008 |

OTHER PUBLICATIONS

Chinese Office Action (Application No. 200510119241.9) Dated: May 23, 2008 with English Translation.

* cited by examiner

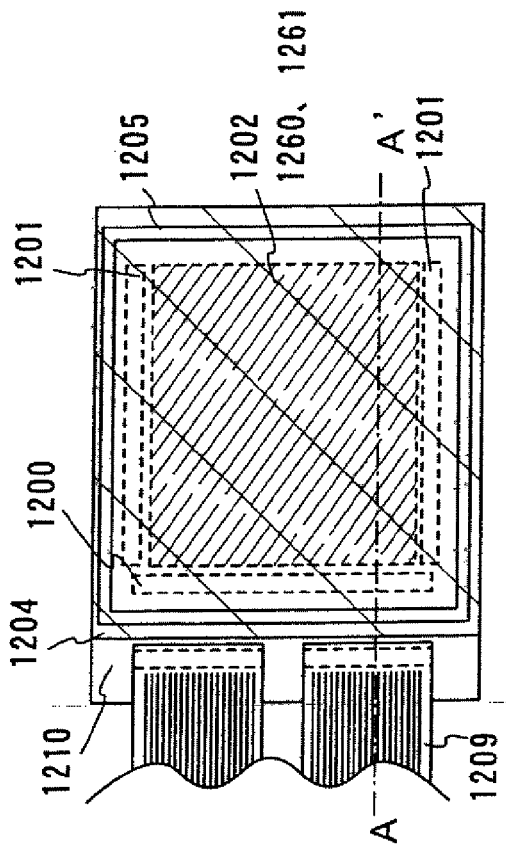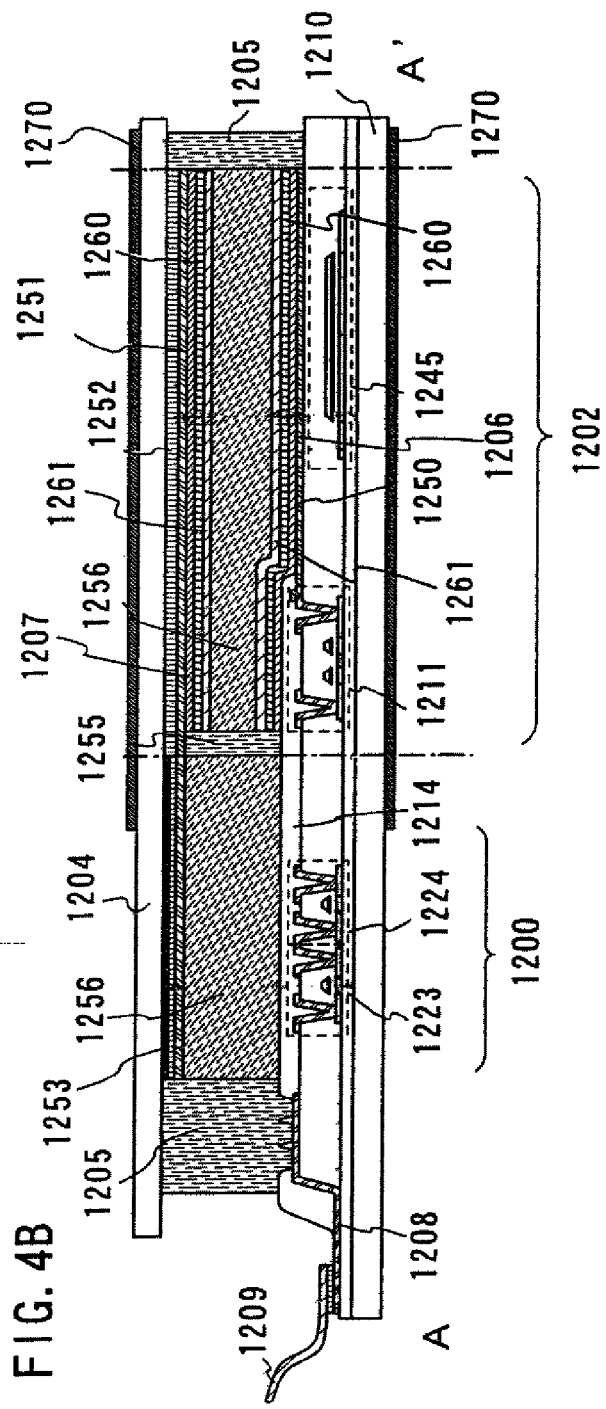
FIG. 4A
FIG. 4B

LIQUID CRYSTAL DISPLAY DEVICE

BACKGROUND OF THE INVENTION

1. Field of the Invention

The present invention relates to a liquid crystal display device, and further, to technology of an optical film, and more particularly, a phase difference film of a liquid crystal display device.

2. Related Art

In recent years, demand for a liquid crystal display device as a flat panel display has grown since the liquid crystal display device has advantages of thinness, lightweight and being capable of low-power-consumption driving. The liquid crystal display has various modes, and liquid crystal displays using a nematic liquid crystal include a twisted nematic (TN) mode, a vertical alignment (VA) mode, an in plane switching (IPS) mode, an optically compensated bend (OCB) mode and the like. Further, a ferroelectric liquid crystal mode and an antiferroelectric liquid crystal mode in which a response speed is faster than in a nematic liquid crystal are also proposed.

In addition, many other modes are proposed. However, when a liquid crystal display is used as a display, phase difference films 701 are provided outside a liquid crystal 702 and substrates 703 as shown in FIG. 12 not to generate viewing angle dependency of transmitted light intensity and a color. Further, polarizing plates 700 are provided outside the phase difference films 701. This phase difference film 701 is also referred to as an optical compensation film or a phase difference plate.

Although it depends on a liquid crystal mode or a liquid crystal to be used, as for a phase difference film that is used for a liquid crystal display, a uniaxial film and a biaxial film may be stacked.

This phase difference film is usually manufactured by uniaxial or biaxial drawing of a plastic film.

As another method, a phase difference film is also manufactured by using a discotic liquid crystal as described in Patent Document 1.

However, these phase difference films are attached to the outside a substrate so that an adhesion layer is necessary for the phase difference films. In addition, TAC (cellulose triacetate) is necessary to protect the phase difference films. Therefore, in order to manufacture a phase difference film, a structure of several layers stacked is employed, and thus, the thickness is submicron, which results in high cost.

On the other hand, it is also reported that a phase difference film is placed inside a liquid crystal cell in order to reduce cost. (Refer to, for example, a Non-Patent Document 1)

This method provides the following advantages; namely, strong film-adhesiveness, more lightness in weight, and the thinner thickness such as 1 µm to 5 µm.

However, this method is a manufacturing method for only a uniaxial film, and a manufacturing method for a biaxial film has not yet been made clear.

In addition, even when the same uniaxial film is used, it is necessary to change the thickness in order to change a phase difference, since a phase difference is usually determined by $\Delta n \times d$ in the case where the birefringence of a phase difference film is $\Delta n$ and the thickness is d.

In accordance with this method, a phase difference film is placed between an electrode and a liquid crystal that are provided inside a substrate. Therefore, although the thickness of a phase difference film is thinner, namely 1 µm to 5 µm, the thickness of the liquid crystal is 1.5 µm to 6 µm, and thus, there is caused a problem that voltage is not easily applied to the liquid crystal as compared with a case where the phase difference film is provided outside the substrate.

[Patent Document 1]
Japanese Patent Application Laid-Open No.: Hei8-50206
[Non-Patent Document 1]
B. M. I. van der Zande et al, SID DIGEST, p 194-197 (2003)

SUMMARY OF THE INVENTION

In view of the problems as described above, it is an object of the present invention to provide a method for manufacturing a thin phase difference film of a liquid crystal display easily so as not to prevent a liquid crystal from being driven so that the cost for manufacturing a liquid crystal display is more reduced than conventionally.

In order to solve the problems as described above, a liquid crystal display device according to the present invention has a structure in which, over each of a first substrate and a second substrate that has an electrode formed thereover, a phase difference film that has the same function as a conventional phase difference film is formed by using a liquid crystal stabilized with a polymer and a liquid crystal material is interposed between the first and second substrates.

In addition to the structure described above, it is also a feature that the phase difference film formed over the substrate is formed by using a liquid crystal stabilized with a polymer including a conductive material.

In an aspect of the present invention, a liquid crystal display device includes a first substrate, a first electrode formed over the first substrate, a first orientation film formed over the first electrode and a first phase difference film formed over the first orientation film, and a second substrate provided with a second electrode, a second orientation film, and a second phase difference film, where a liquid crystal is interposed between the first phase difference film formed over the first substrate and the second phase difference film provided with the second substrate.

In addition, in the aspect described above, a liquid crystal stabilized with an acrylic resin is used for the first phase difference film and the second phase difference film.

In addition, in another aspect of the present invention, the first phase difference film and the second phase difference film are patterned.

In addition, in another aspect of the present invention, each of the first phase difference film and the second phase difference film has at least two films.

In addition, in another aspect of the present invention, a conductive material is included in the first phase difference film and the second phase difference film.

In the case of a liquid crystal display device according to the present invention as described above, a phase difference film can be provided between an electrode and a liquid crystal, further, the problem of a thick film caused in manufacturing a conventional phase difference film is solved, and thus, it is possible to provide a liquid crystal display device including an inexpensive phase difference film manufactured without preventing a liquid crystal from being driven.

Moreover, since phase difference films can be stacked, phase difference films for various liquid crystal modes can be designed.

These and other objects, features and advantages of the present invention will become more apparent upon reading of the following detailed description along with the accompanied drawings.

BRIEF DESCRIPTION OF THE DRAWINGS

FIGS. 4A and 4B are schematic diagrams of a liquid crystal display device according to the present invention.

DESCRIPTION OF THE INVENTION

Embodiment Modes of the present invention will be described below.

Embodiment Mode 1

A liquid crystal display device will be described with reference to FIG. 1, and FIGS. 2A and 2B here.

Figure 1:
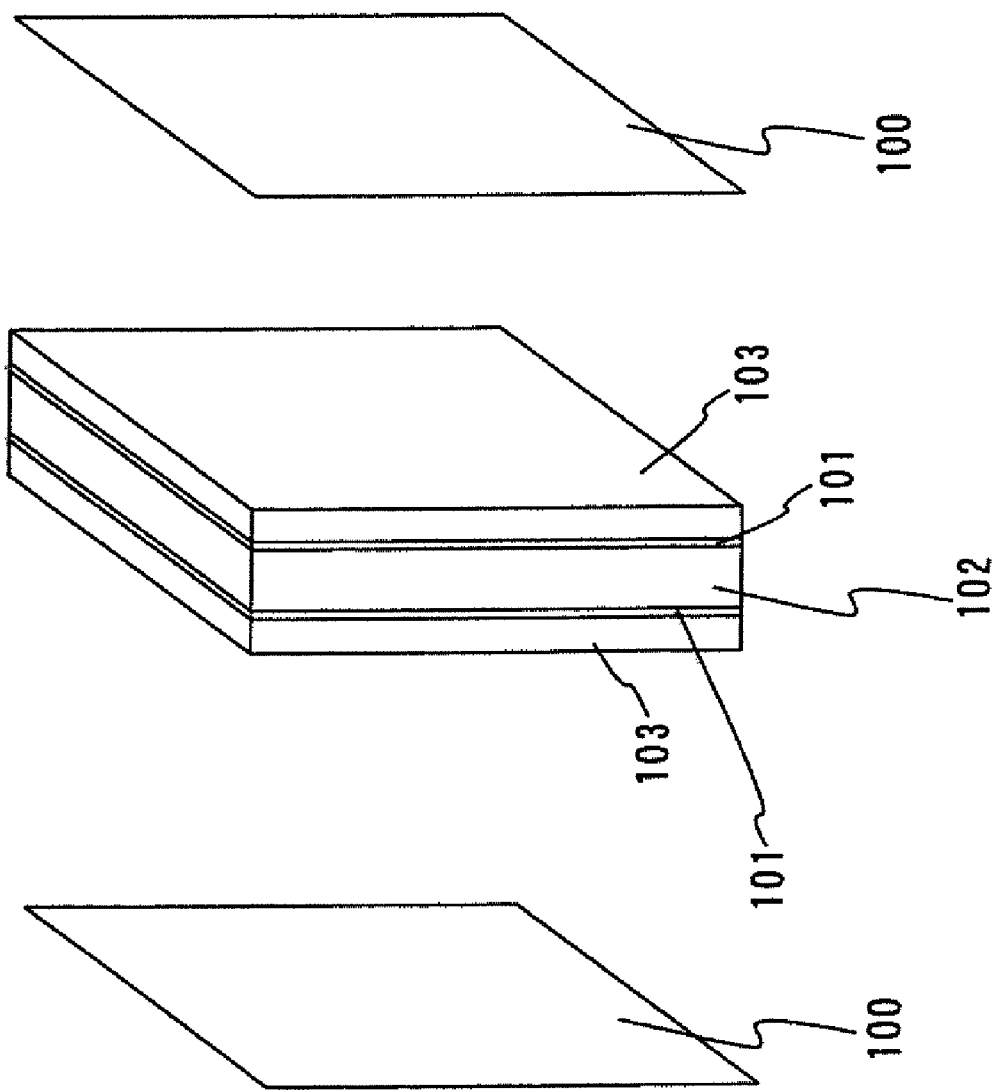
FIG. 1 is a schematic diagram of a liquid crystal display device according to the present invention.
Figure 2A:
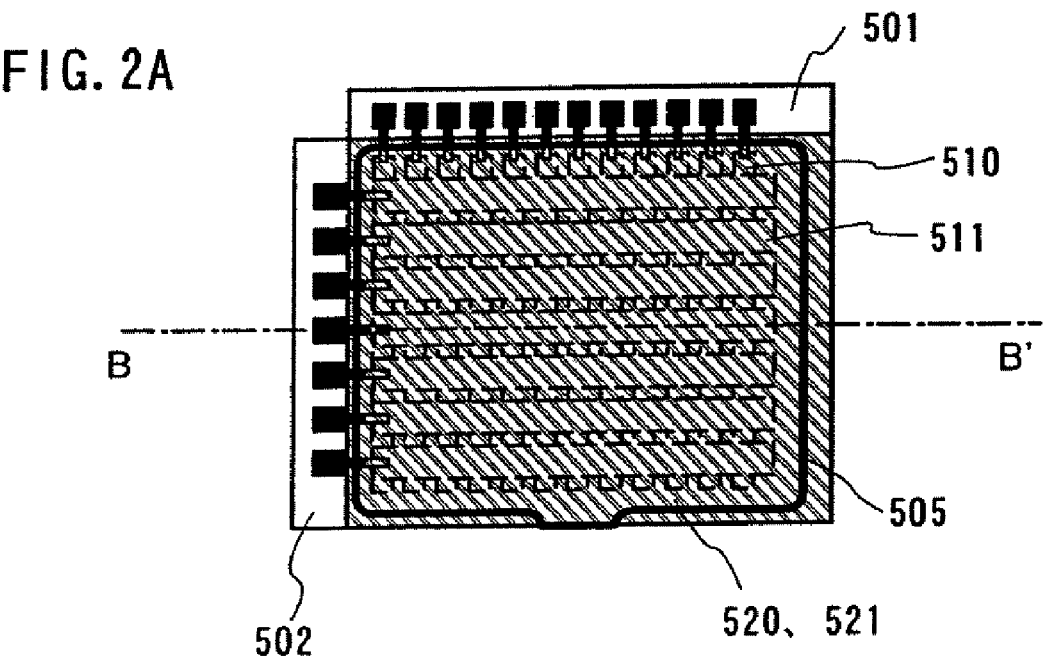
FIGS. 2A and 2B are schematic diagrams of a liquid crystal display device according to the present invention.
Figure 2B:
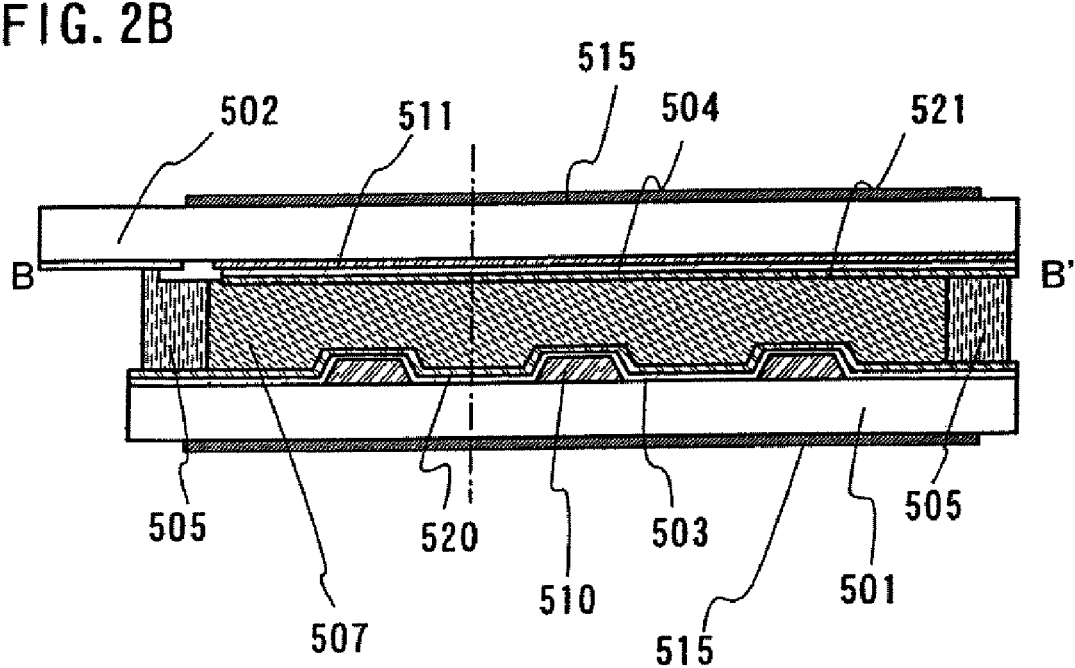

In the present embodiment mode, as shown in FIG. 1, phase difference films 101 are provided inside substrates 103, and a liquid crystal 102 is provided inside the phase difference films 101. In addition, polarizing plates 100 are provided outside of the substrates 103.

Hereinafter, a passive matrix type will be explained with reference to FIGS. 2A and 2B. FIG. 2A is a top view of a liquid crystal display device and FIG. 2B is a cross-sectional view of the liquid crystal display device shown in FIG. 2A along B-B'. A transparent electrode 510 is provided over a first substrate 501 and an orientation film 503 is provided thereover, for which a rubbing process is conducted. The orientation film 503 and the rubbing process are necessary or unnecessary depending on a liquid crystal mode that is used.

Further, a phase difference film 520 formed by using a liquid crystal that is stabilized with a polymer (also referred to as a polymer-stabilized liquid crystal) is provided over the orientation film 503. For the phase difference film 520, a liquid crystal is mixed into an UV-cured resin material that includes a photopolymerization initiator, and irradiated with ultraviolet light to be polymerized. The liquid crystal used here may be a nematic liquid crystal, a ferroelectric liquid crystal or an antiferroelectric liquid crystal. When the thickness of the phase difference film is made thin, a liquid crystal material that has a large Δn may be mixed therein. Moreover, a chiral agent may be mixed therein if necessary. It is to be noted that an acrylic resin can be used as the UV-cured resin material. As for the mixing ratio of the UV-cured resin material and the liquid crystal, the ratio of the liquid crystal is preferably less than 50 wt %, since a polymer region is narrowed so that the phase difference film is no more a film when the ratio of the liquid crystal is high.

In order to obtain a uniaxial phase difference film, a nematic liquid crystal that includes no chiral agent may be mixed into an UV-cured resin material. In addition, in order to obtain a biaxial phase difference film, a ferroelectric liquid crystal, an antiferroelectric liquid crystal or a chiral agent may be mixed into an UV-cured resin material. Alternatively, these liquid crystals and the agent may be combined. In addition, a conductive material may be mixed therein. It is to be noted that a metallic particle such as Au can be used as the conductive material. The ratio of a conductive material included in the phase difference film is preferably 10 wt % or less to keep transparence of the phase difference film.

It is not always necessary that the liquid crystals mixed in the phase difference film 520 and a phase difference film 521 and a liquid crystal 507 interposed between the first substrate and a second substrate be the same. Since a phase difference is determined by Δn×d, the types of the liquid crystals and a light-transmitting resin are appropriately selected with respect to a phase difference to be obtained. In that case, an anisotropic resin may also be used. It is to be noted that d is less than 1 μm. In addition, it is preferable that the surface of the phase difference film be coated with a light-transmitting resin.

As a method for applying the polymer-stabilized liquid crystal that forms the phase difference film 520, a dropping method, spin coating, ink-jet, dye coating, wire-bar coating, glass-bar coating or the like can be used.

The polymer-stabilized liquid crystal is applied and then irradiated with UV light under a nitrogen atmosphere to be polymerized. If necessary, a rubbing process may be conducted after the UV irradiation.

Also over the second substrate 502 that serves as an opposed substrate, in the same manner as the first substrate 501, a transparent electrode 511 and an orientation film 504 are provided and a rubbing process is conducted. Also, as for this orientation film 504, the orientation film 504 and the rubbing process are necessary or unnecessary depending on a liquid crystal mode that is used. Further, the phase difference film 521 formed by using a polymer-stabilized liquid crystal is provided in the same manner as the first substrate 501.

Although not illustrated here, a columnar spacer is provided over the second substrate 502. The column spacer keeps a gap between the first substrate 501 and the second substrate 502, and a bead spacer may also be used. In addition, in a small-area liquid crystal display device, a spacer is not always provided.

A sealant 505 is applied to the first substrate 501 or the second substrate 502, and the first substrate 501 and the second substrate 502 are attached to each other. The shape of the applied sealant 505 depends on a method for injecting the liquid crystal 507. In the case of a normal vacuum-injecting method, the sealant 505 has a shape with one opening; however, in the case of a method of dropping and vacuum-bonding (One Drop Filling: ODF), the sealant 505 needs to have a loop shape with an opening closed.

The liquid crystal 507 is injected between the first substrate 501 and the second substrate 502. The liquid crystal 507 is normally injected in vacuum. When the liquid crystal is not injected in vacuum, the injection is conducted by using capillarity under the condition where the sealant has two or more openings. When the liquid crystal 507 is injected by a method of dropping and vacuum-bonding, the liquid crystal 507 is dropped to the first substrate 501 or the second substrate 502 before the first substrate 501 and the second substrate 502 are attached to each other, and then, the substrates are attached in vacuum.

Then, the first substrate 501 and the second substrate 502 are cut to have a panel shape. When the sealant has an opening at this point, the opening is filled with a sealing material.

Moreover, the first substrate 501 and the second substrate 502 are appropriately provided with a polarizing plate 515 in order to enhance contrast.

As a liquid crystal mode for the liquid crystal display device in the present embodiment mode, a TN mode, an STN mode, an IPS mode, a VA mode, a ferroelectric liquid crystal mode, an antiferroelectric liquid crystal mode, an OCB mode, a birefringence mode, a guest host mode, a dynamic scattering mode, a phase transition mode and the like can be applied. In addition, the display device can be applied to any of a transmission type, a reflection type, and a semi-transmission type.

As described above, the phase difference film formed by using the polymer-stabilized liquid crystal is provided inside the panel, and the phase difference film can be thin. Therefore, a liquid crystal display device which does not prevent a liquid crystal from being driven can be provided.

Embodiment Mode 2

Figure 3A:
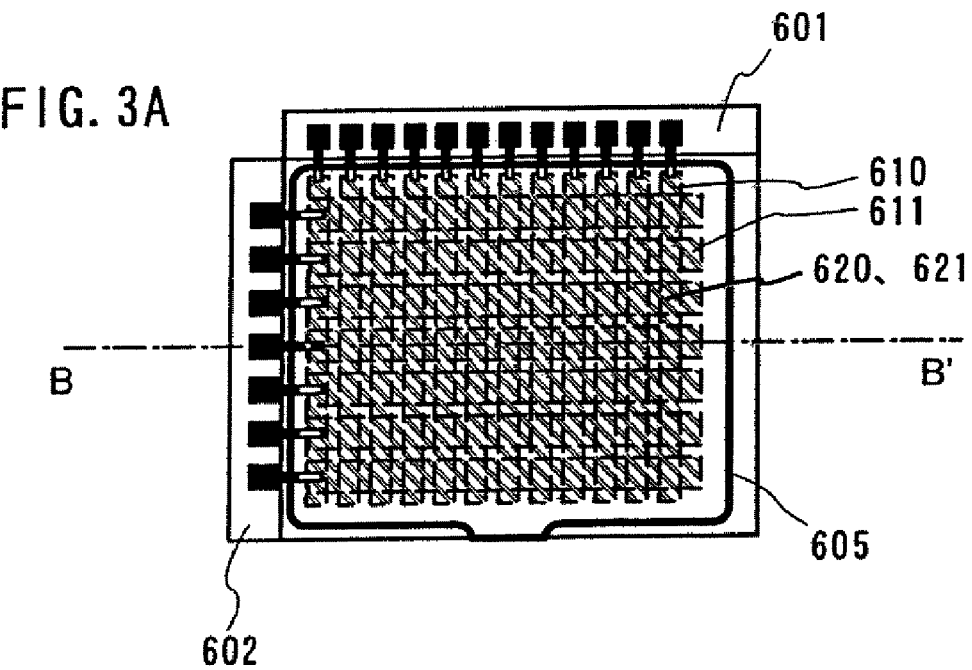
FIGS. 3A and 3B are schematic diagrams of a liquid crystal display device according to the present invention.

In the present embodiment mode, a case where the phase difference film in Embodiment Mode 1 is patterned will be described with reference to FIGS. 3A and 3B.

Figure 3B:
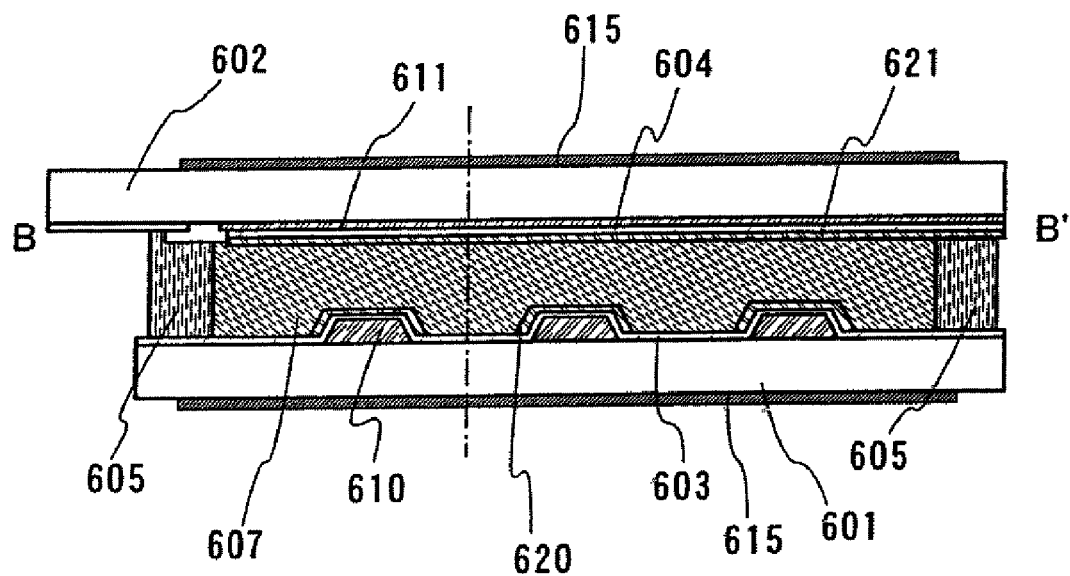

As for a first substrate 601 in FIG. 3B, the manufacturing process is the same as in Embodiment Mode 1 until an orientation film 603 is provided. The orientation film 603 and the rubbing process are necessary or unnecessary depending on a liquid crystal mode that is used.

Further, a patterned phase difference film 620 formed by using a polymer-stabilized liquid crystal is provided. When a UV-cured resin material is cured by UV irradiation under a nitrogen atmosphere, a light-shielding mask that has an opened portion corresponding to a transparent electrode 610 is used so that only a pixel region is irradiated with ultraviolet light. Therefore, the phase difference film 620 formed by using the polymer-stabilized liquid crystal is provided only over the transparent electrode 610. A portion that is not irradiated with ultraviolet light except the pixel region is washed with acetone or the like after the UV irradiation. After the UV irradiation, the rubbing process is conducted if necessary.

As for a second substrate 602 that serves as an opposed substrate, the manufacturing process is the same as in Embodiment Mode 1 until an orientation film 604 is provided. Over the orientation film 604, a phase difference film 621 formed by using a polymer-stabilized liquid crystal is provided over a transparent electrode 611 that is a pixel region.

A sealant 605 is applied to the first substrate 601 or the second substrate 602, and the first substrate 601 and the second substrate 602 are attached to each other. The shape of the applied sealant 605 depends on a method for injecting a liquid crystal 607. In the case of a normal vacuum-injecting method, the sealant 605 has a shape with one opening; however, in the case of a method of dropping and vacuum-bonding, the sealant 605 needs to have a loop shape with an opening closed.

Then, the liquid crystal 607 is injected between the first substrate 601 and the second substrate 602. The liquid crystal 607 is normally injected in vacuum. When the liquid crystal is not injected in vacuum, the injection is conducted by using capillarity under the condition where the sealant has two or more openings. When the liquid crystal 607 is injected by a method of dropping and vacuum-bonding, the liquid crystal 607 is dropped to the first substrate 601 or the second substrate 602 before the first substrate 601 and the second substrate 602 are attached to each other, and then, the substrates are attached in vacuum.

Then, the first substrate 601 and the second substrate 602 are attached as in Embodiment Mode 1 and cut. Further, the first substrate 601 and the second substrate 602 are appropriately provided with a polarizing plate 615 in order to enhance contrast.

As a liquid crystal mode for the liquid crystal display device in the present embodiment mode, a TN mode, an STN mode, an IPS mode, a VA mode, a ferroelectric liquid crystal mode, an antiferroelectric liquid crystal mode, an OCB mode, a birefringence mode, a guest host mode, a dynamic scattering mode, a phase transition mode and the like can be applied. In addition, the display device can be applied to any of a transmission type, a reflection type, and a semi-transmission type.

As described above, the phase difference film formed by using the polymer-stabilized liquid crystal is provided inside the panel, and patterning is conducted only for a minimally required pixel region. Therefore, a liquid crystal display device that uses this phase difference film can be formed even when adhesiveness of the phase difference film and the sealant is bad. The yield of a liquid crystal display device can be improved by using a phase difference film that has this shape.

Embodiment Mode 3

In the present embodiment mode, a case where phase difference films are stacked over a substrate (TFT substrate) over which a thin film transistor (TFT) is formed will be described with reference to FIGS. 4A and 4B.

FIG. 4A shows a liquid crystal display device in which a signal line driving circuit 1200, a scanning line driving circuit 1201, and a pixel region 1202 are formed over a first substrate 1210.

FIG. 4B is a cross-sectional view of the liquid crystal display device in FIG. 4A along A-A', and shows the signal line driving circuit 1200 provided with a CMOS circuit that includes an n-channel TFT 1223 and a p-channel TFT 1224 over the first substrate 1210. The n-channel TFT 1223 and the p-channel TFT 1224 are formed by laser annealing with the use of a pulse laser to have a crystalline semiconductor film in which crystal grains are aligned. It is particularly preferable to form a channel forming region from one crystal grain. The TFTs which form the signal line driving circuit 1200 and the scanning line driving circuit 1201 may be formed by using a CMOS circuit, a PMOS circuit or an NMOS circuit. Further, an FPC 1209 connected to a connecting wiring 1208 is formed over the first substrate 1210.

The pixel region 1202 includes a switching TFT 1211 and a capacitor element 1245. The switching TFT 1211 is formed by laser annealing with the use of a pulse laser to have a crystalline semiconductor film in which crystal grains are aligned. It is particularly preferable to form a channel forming region from one crystal grain. The capacitor element 1245 is formed by a gate insulating film that is interposed between a semiconductor film doped with an impurity and a gate electrode. It is unnecessary that a TFT in the pixel region 1202 has high crystallinity as compared with the signal line driving circuit 1200 and the scanning line driving circuit 1201. The pixel region 1202 includes a pixel electrode 1250 that is connected to one electrode of the switching TFT 1211, and an insulator 1214 is provided to cover the n-channel TFT 1223, the p-channel TFT 1224, the pixel electrode 1250 and the switching TFT 1211. Then, an orientation film 1206 is provided, and a rubbing process is conducted. The orientation film 1206 and the rubbing process are necessary or unnecessary depending on a liquid crystal mode that is used.

Further, a patterned first phase difference film 1260 is provided. The rubbing process is conducted to the first phase difference film 1260 if necessary, and a second phase difference film 1261 is provided in the same manner as the first phase difference film 1260. If necessary, a rubbing process is conducted after UV irradiation.

A second substrate 1204 that serves as an opposed substrate is provided with a black matrix 1253 at the position which overlaps with the signal line driving circuit 1200 and a color filter 1252 at the position which overlaps with at least the pixel region 1202. Then, the second substrate 1204 with an opposed electrode 1251 formed thereover is provided with a columnar spacer 1255. The columnar spacer 1255 keeps a gap between the first substrate 1210 and the second substrate 1204, and a bead spacer may also be used. In addition, in a small-area liquid crystal display device, a spacer is not always provided.

In addition, an orientation film 1207 is provided, and a rubbing process is conducted. As for this opposed substrate, similarly to the first substrate, the orientation film and the rubbing process are necessary or unnecessary depending on a liquid crystal mode that is used.

Further, the first phase difference film 1260 and the second phase difference film 1261 are provided over the second substrate 1204 as in the case of the first substrate 1210. The phase difference films 1260 and 1261 are not necessarily composed of two layers, and may have three or more layers if necessary. Moreover, in the case of a reflection type liquid crystal display device, only the second substrate 1204 that serves as an opposed substrate may have a phase difference film.

A sealant 1205 is applied to the first substrate 1210 or the second substrate 1204, and the first substrate 1210 and the second substrate 1204 are attached to each other. The shape of the applied sealant 1205 depends on a method for injecting a liquid crystal 1256. In the case of a normal vacuum-injecting method, the sealant 1256 has a shape with one opening; however, in the case of a method of dropping and vacuum-bonding, the sealant 1256 needs to have a loop shape with an opening closed.

The liquid crystal 1256 is injected between the first substrate 1210 and the second substrate 1204. The liquid crystal 1256 is normally injected in vacuum. When the liquid crystal is not injected in vacuum, the injection is conducted by using capillarity under the condition where the sealant has two or more openings. When the liquid crystal 1256 is injected by a method of dropping and vacuum-bonding, the liquid crystal 1256 is dropped to the first substrate 1210 or the second substrate 1204 before the first substrate 1210 and the second substrate 1204 are attached to each other, and then, the substrates are attached in vacuum.

Then, the first substrate 1210 and the second substrate 1204 are cut to have a panel shape. When the sealant has an opening at this point, the opening is filled with a sealing material. Moreover, the first substrate 1210 and the second substrate 1204 are appropriately provided with a polarizing plate 1270 in order to enhance contrast.

As a liquid crystal mode of a liquid crystal display device in the present embodiment mode, a TN mode, an STN mode, an IPS mode, a VA mode, a ferroelectric liquid crystal mode, an antiferroelectric liquid crystal mode, an OCB mode, a birefringence mode, a guest host mode, a dynamic scattering mode, a phase transition mode and the like can be applied. In addition, the display device can be applied to any of a transmission type, a reflection type, and a semi-transmission type.

As described above, since the polymer-stabilized liquid crystals, namely, the phase difference films are stacked inside the panel, it is possible to stack a uniaxial film and a biaxial film, stack different uniaxial films, or stack different biaxial films. Therefore, a liquid crystal display device that has a wide application range can be provided.

Embodiment Mode 4

A liquid crystal display device that is formed by implementing any one of Embodiment Modes 1 to 3 described above can be applied to various electronic devices. In other words, the liquid crystal display device can be incorporated in a display portion of electronic devices as will be described below.

Electronic devices as described above include a TV set, a video camera, a digital camera, a projector, a head mount display (a goggle-type display), a car navigation system, an in-car audio system, a personal computer, a personal digital assistant (such as a mobile computer, a cellular phone, or an electronic book) and the like. FIGS. 5A to 5E and FIG. 6 show specific examples of these electronic devices.

Figure 5A:
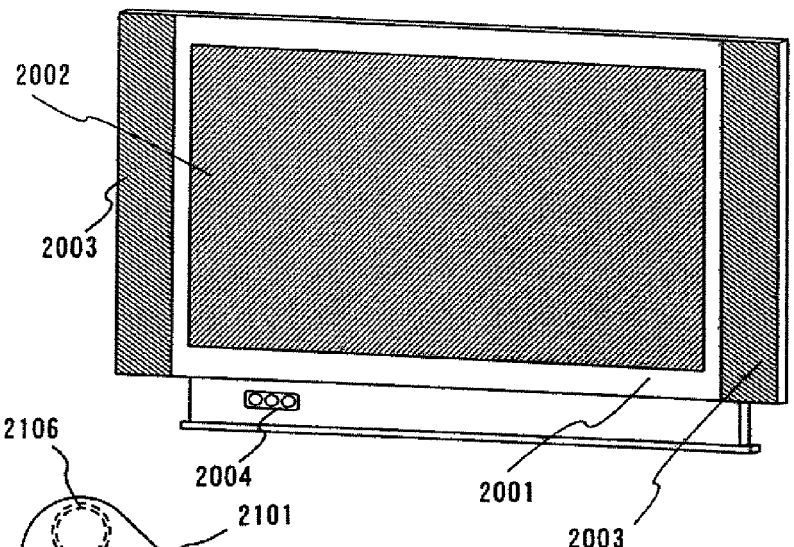
FIGS. 5A to 5E are diagrams illustrating examples of electronic devices.

FIG. 5A is a TV set, which can be manufactured by incorporating a liquid crystal display device as shown in Embodiment Modes 1 to 3 in a frame body 2001. It is to be noted that a display screen 2002 is formed by using a liquid crystal display device according to the present invention. In addition, a speaker 2003, operation switches 2004, and the like are appropriately provided.

A TV set that is thinner and cheaper than a conventional one can be provided by manufacturing the TV set to include the liquid crystal display device according to the present invention.

Figure 5B:
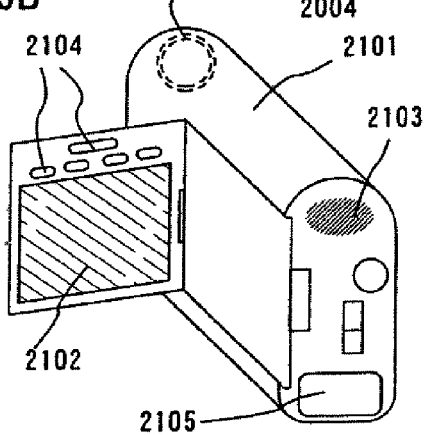

FIG. 5B is a video camera, which includes a main body 2101, a display portion 2102, a sound input portion 2103, operation switches 2104, a battery 2105, an image receiving portion 2106 and the like. It is to be noted that the display portion 2102 is formed by using a liquid crystal display device according to the present invention.

A video camera that is thinner and cheaper than a conventional one can be provided by manufacturing the video camera to include the liquid crystal display device according to the present invention.

Figure 5C:
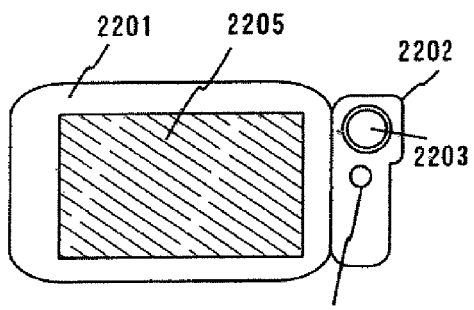

FIG. 5C is a mobile computer, which includes a main body 2201, a camera portion 2202, an image receiving portion 2203, an operation switch 2204, a display portion 2205 and the like. It is to be noted that the display portion 2205 is formed by using a liquid crystal display device according to the present invention.

A mobile computer that is thinner and cheaper than a conventional one can be provided by manufacturing the mobile computer to include the liquid crystal display device according to the present invention.

Figure 5D:
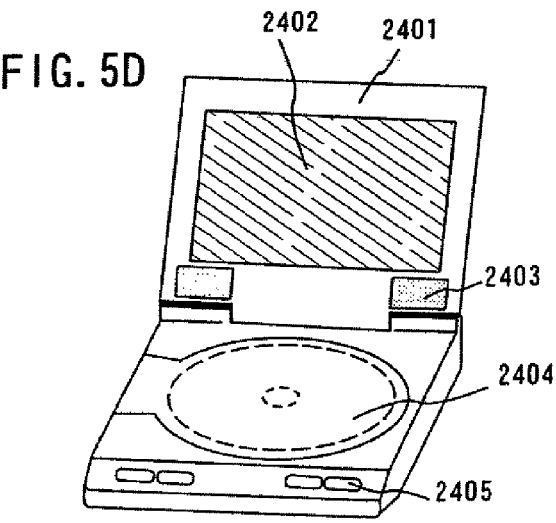

FIG. 5D is a player using a recording medium in which a program is recorded (hereinafter referred to as a recording medium), which includes a main body 2401, a display portion 2402, a speaker portion 2403, a recording medium 2404, operation switched 2405 and the like. This player make it possible to appreciate music and cinema, play games and connect to the Internet by using a DVD, a CD or the like as a recording medium. It is to be noted that the display portion 2402 is formed by using a liquid crystal display device according to the present invention.

A player that is thinner and cheaper than a conventional one can be provided by manufacturing the player to include the liquid crystal display device according to the present invention.

Figure 5E:
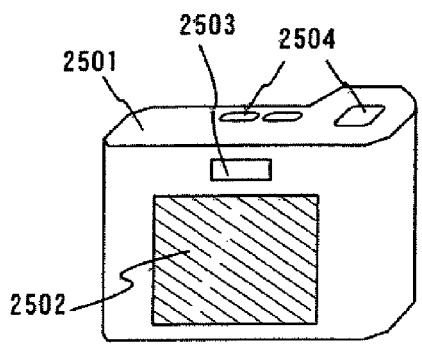

FIG. 5E is a digital camera, which includes a main body 2501, a display portion 2502, an eye piece 2503, operation switches 2504, an image receiving portion (not illustrated) and the like. It is to be noted that the display portion 2502 is formed by using a liquid crystal display device according to the present invention.

A digital camera that is thinner and cheaper than a conventional one can be provided by manufacturing the digital camera to include the liquid crystal display device according to the present invention.

Figure 6:
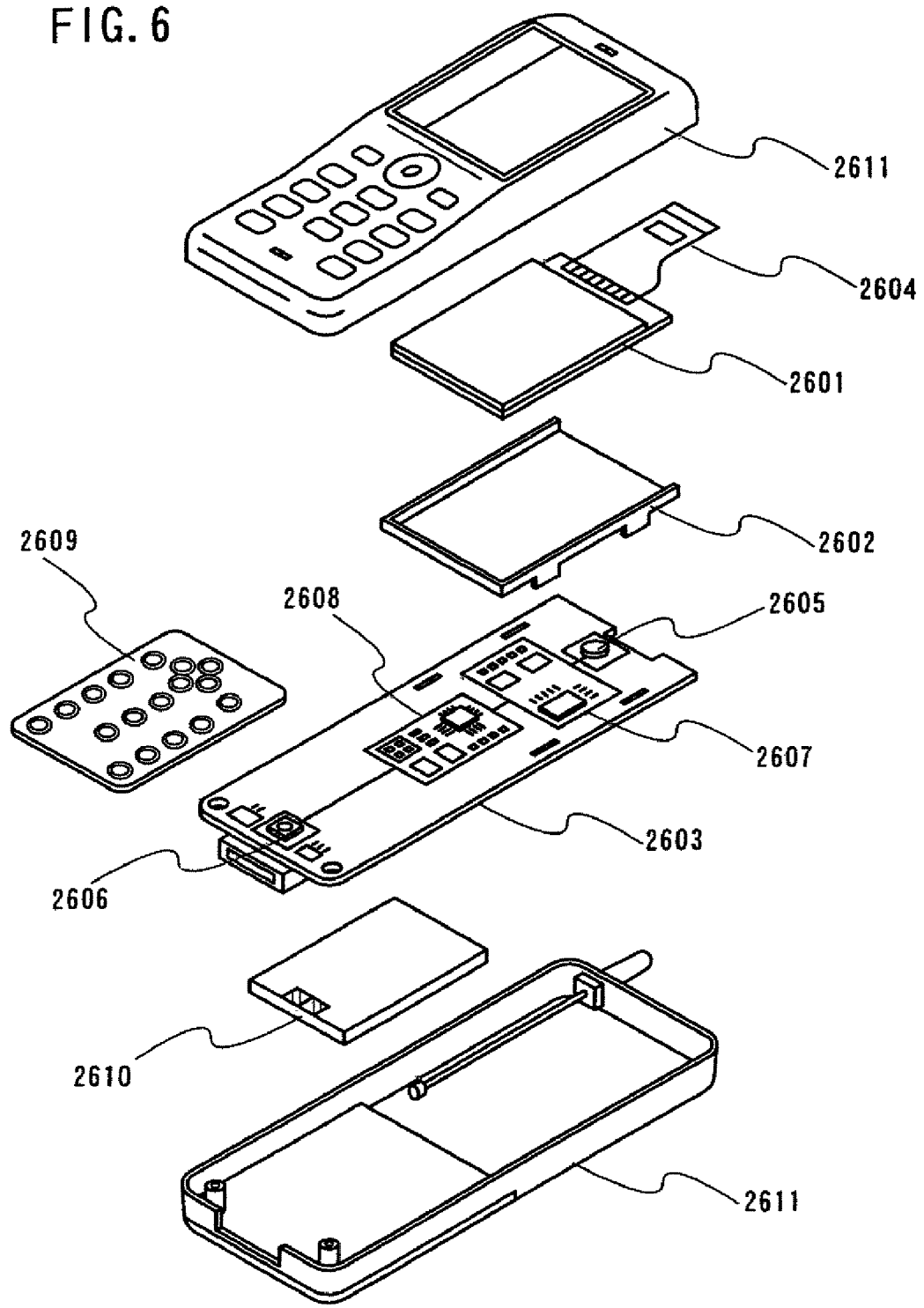
FIG. 6 is a diagram illustrating one example of electronic devices.

FIG. 6 is one example of a cellular phone that includes a liquid crystal display device according to the present invention. A liquid crystal display device 2601 is incorporated in a housing 2602 to be detachable. The shape and the size of the housing 2602 can be changed appropriately depending on the size of the liquid crystal display device 2601. The housing 2602, in which the liquid crystal display device 2601 is fixed, is attached to a printed substrate 2603, and a module is built.

The liquid crystal display device 2601 is connected to the printed substrate 2603 through an FPC 2604. Over the printed substrate 2603, a signal processing circuit 2608 is provided, which includes a speaker 2605, a microphone 2606, a transmit and receive circuit 2607, a CPU, a controller and the like. This module, an input means 2609, and a battery 2610 are combined and stored in a frame body 2611. A pixel portion of the liquid crystal display device 2601 is placed so as to be recognized from an aperture that is formed in the frame body 2611.

A cellular phone that is thinner and cheaper than a conventional one can be provided by manufacturing the cellular phone to include the liquid crystal display device according to the present invention.

The cellular phone in accordance with the present embodiment mode can be changed into various modes depending on a function or a purpose thereof. For example, even when the cellular phone has a plurality of the liquid crystal display devices or has a hinged open and shut structure by appropriately separating a frame body into a plurality of frame bodies, the advantages described above can be obtained.

As described above, the present invention has a remarkably wide application range, and the invention can be applied to electronic devices in various fields. In addition, the electronic devices in the present embodiment mode can be manufactured by using a structure that has any combination of Embodiment Modes 1 to 3.

Embodiment Mode 5

The present embodiment mode shows examples of display devices that use the liquid crystal display device as described in Embodiment Modes 1 to 3. A rear-projection display device 801 shown in FIGS. 7A and 7B includes a projector unit 802, a mirror 803 and a screen panel 804. In addition, a speaker 805 and operation switches 806 may also be provided. The projector unit 802 is placed in the lower position of a frame body 807 of the rear-projection display device 801, and projects light for showing an image toward the mirror 803, based on an image signal. The rear-projection display device 801 displays an image that is projected from the backside of the screen panel 804.

Figure 8:
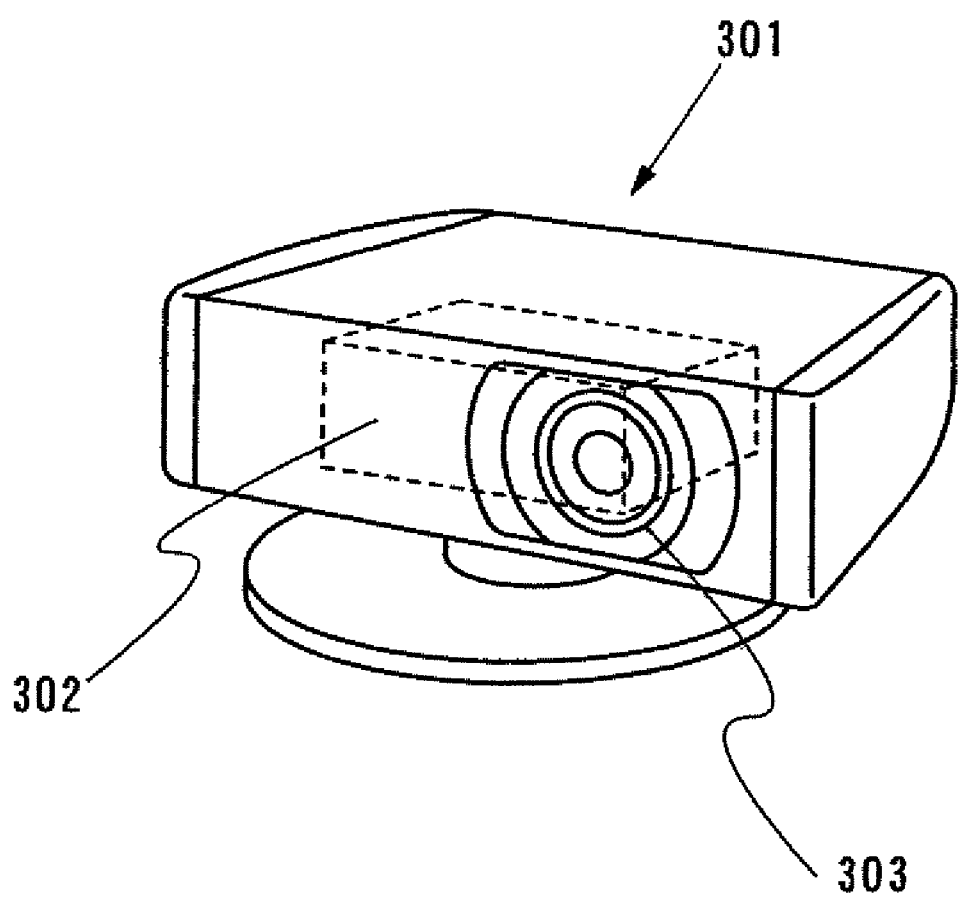
FIG. 8 is a diagram illustrating one example of electronic devices.

On the other hand, FIG. 8 shows a front-projection display device 301. The front-projection display device 301 includes a projector unit 302 and a projection optical system 303. The front-projection display device 301 projects an image on a screen placed in front and the like.

The structures of projector units that are applied to the rear-projection display device 801 shown in FIGS. 7A and 7B and the front-projection display device 301 shown in FIG. 8 will be described below.

Figure 9:
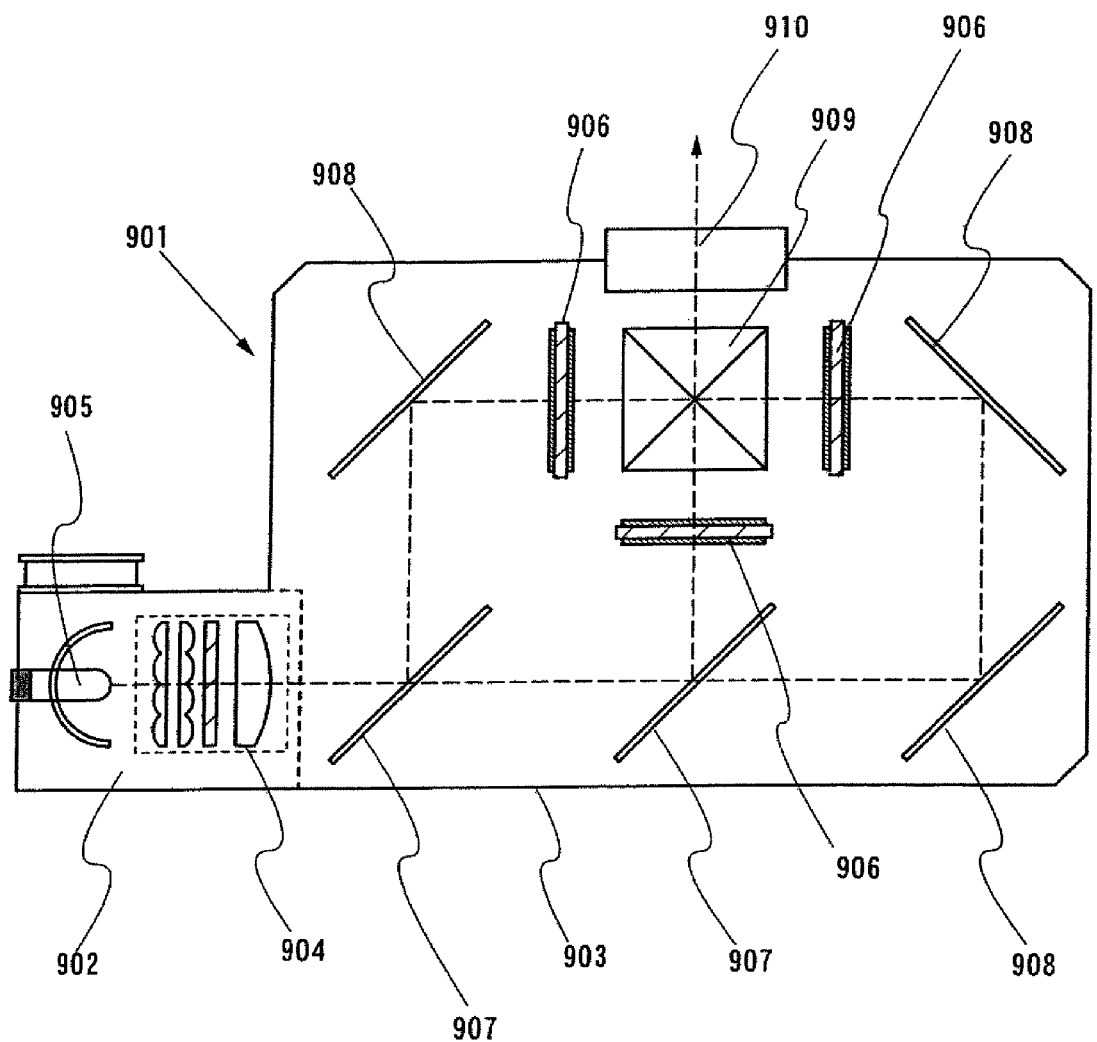
FIG. 9 is a diagram illustrating one example of electronic devices.

FIG. 9 is one structure example of a projector unit 901. The projector unit 901 includes a light source unit 902 and a modulation unit 903. The light source unit 902 includes a light source optical system 904 composed to include lenses and a light source lamp 905. The light source lamp 905 is stored in a frame body not to diffuse stray light. As the light source lamp 905, for example, a high pressure mercury lamp, a xenon lamp or the like is used, which is capable of emitting the large amount of light. The light source optical system 904 is composed by appropriately including an optical lens, a film that has polarizing property, a film for controlling a phase difference, an IR film and the like. Then, the light source unit 902 is placed so that emitted light goes into the modulation unit 903. The modulation unit 903 includes a plurality of liquid crystal display devices 906, dichroic mirrors 907, total internal reflection mirrors 908, a prism 909, and a projection optical system 910. Light emitted from the light source unit 902 is divided into a plurality of light paths by the dichroic mirror 907.

The liquid crystal display device 906 is provided to each light path. Transmitted light is modulated by the liquid crystal display device 906, which is classified into a transmission type, based on an image signal. Light of each color transmitted through the liquid crystal display device 906 goes into the prism 909 so that an image is displayed on a screen through the projection optical system 910.

Since a phase difference film can be provided between an electrode and a liquid crystal in the liquid crystal display device according to the present invention, a liquid crystal display device can be more easily made thinner and more lightweight than conventionally. Therefore, an inexpensive display device that is made thinner and more lightweight can be provided.

Figure 10:
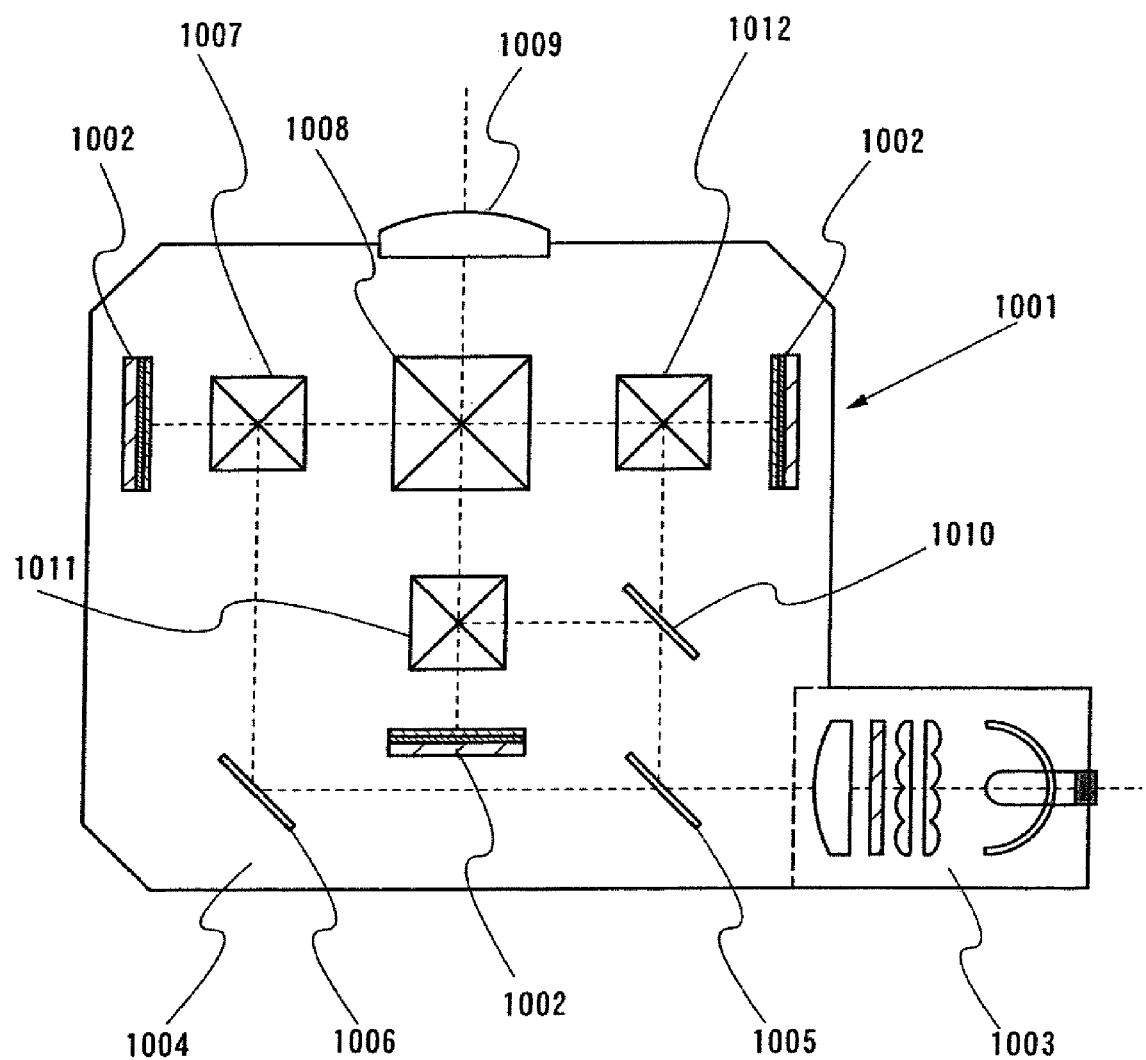
FIG. 10 is a diagram illustrating one example of electronic devices.

A projector unit 1001 shown in FIG. 10 has a structure which is provided with reflection type liquid crystal display devices 1002. The reflection type liquid crystal display device 1002 has a structure in which the pixel electrode in the liquid crystal display device in Embodiment Mode 3 is formed by using aluminum (Al), Ti (titanium), an alloy of these metals or the like.

The projector unit 1001 includes a light source unit 1003 and a modulation unit 1004. The light source unit 1003 has the same structure as in FIG. 9. Light from the light source unit 1003 is divided into a plurality of light paths by dichroic mirrors 1005 and 1010, and goes into a polarizing beam splitter 1007, 1011 or 1012. The polarizing beam splitter 1007 is provided with respect to the reflection type liquid crystal display device 1002 corresponding to each color. The reflection type liquid crystal display device 1002 modulates transmitted light based on an image signal. Light of each color that is reflected by the reflection type liquid crystal display device 1002 goes into a prism 1008, and is projected through a projection optical system 1009.

Of light that is emitted from the light source unit 1003, only light of a wavelength range of red light is transmitted through the dichroic mirror 1005, and light of a wavelength range of green and blue light is reflected by the dichroic mirror 1005. Further, only light of a wavelength range of green light is reflected by the dichroic mirror 1010. The light of a wavelength range of red light, which has been transmitted through the dichroic mirror 1005, is reflected by the total internal reflection minor 1006, and goes into the polarizing beam splitter 1007. In addition, the light of a wavelength range of green light goes into the polarizing beam splitter 1011, and the light of a wavelength range of blue light goes into the polarizing beam splitter 1012. The polarizing beam splitter 1007 has a function of dividing incident light to a P-polarized component and an S-polarized component, and a function of transmitting only the P-polarized component. The reflection type liquid crystal display device 1002 polarizes incident light based on an image signal.

Only the S-polarized component corresponding to each color goes into the reflection type liquid crystal display device 1002 corresponding to each color. The reflection type liquid crystal display device 1002 operates in an electrically controlled birefringence mode (ECB). In addition, a liquid crystal molecule is orientated perpendicularly at an angle to a substrate. Therefore, in the reflection type liquid crystal display device 1002, the liquid crystal molecule is orientated so that incident light is reflected with no change in polarizing state when a pixel is in an OFF state. In addition, when a pixel is in an ON state, the orientation state of the liquid crystal molecule is changed and the polarizing state of incident light is changed.

Figure 7A:
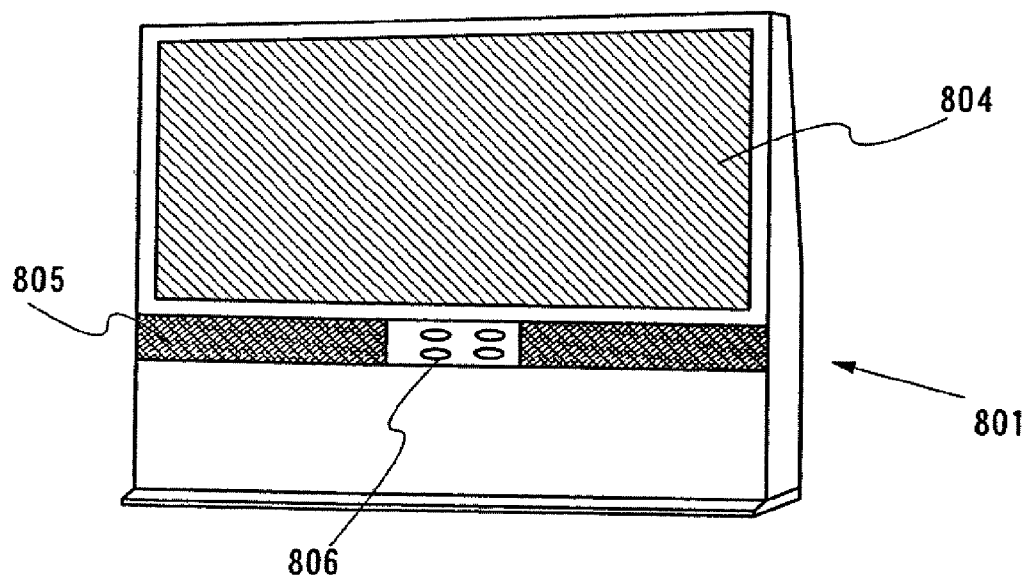
FIGS. 7A and 7B are diagrams illustrating one example of electronic devices.
Figure 7B:
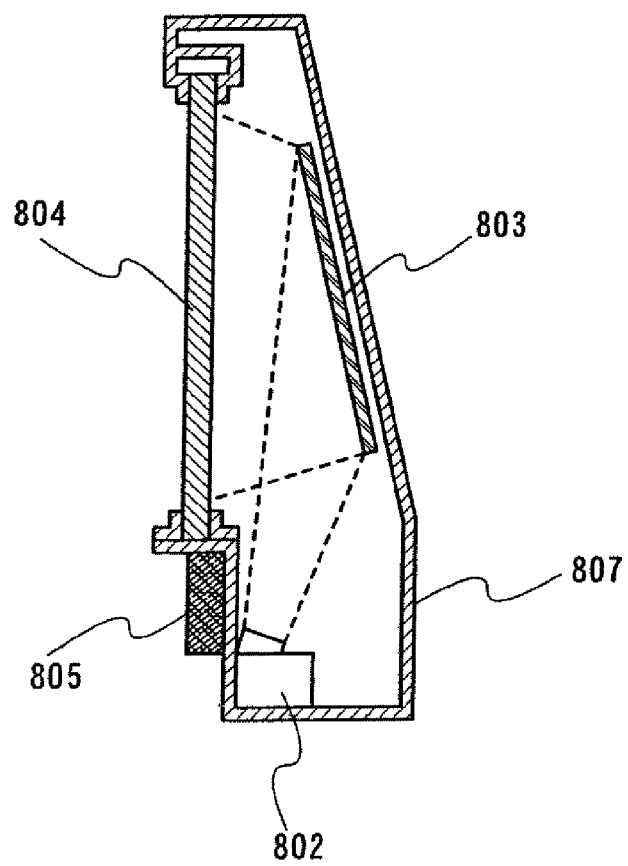

The projector unit 1001 shown in FIG. 10 can be applied to the rear-projection display device 801 shown in FIGS. 7A and 7B and the front-projection display device 301 shown in FIG. 8.

Figure 11A:
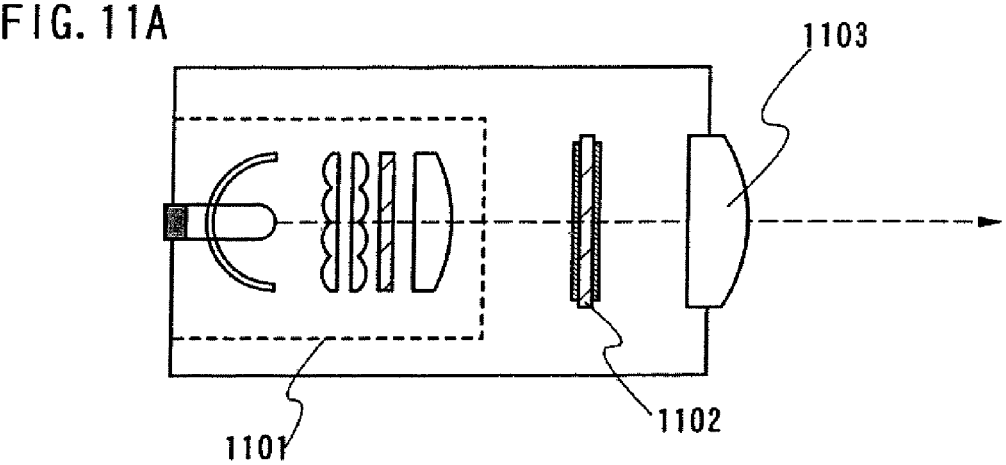
FIGS. 11A to 11C are diagrams illustrating examples of electronic devices.
Figure 11B:
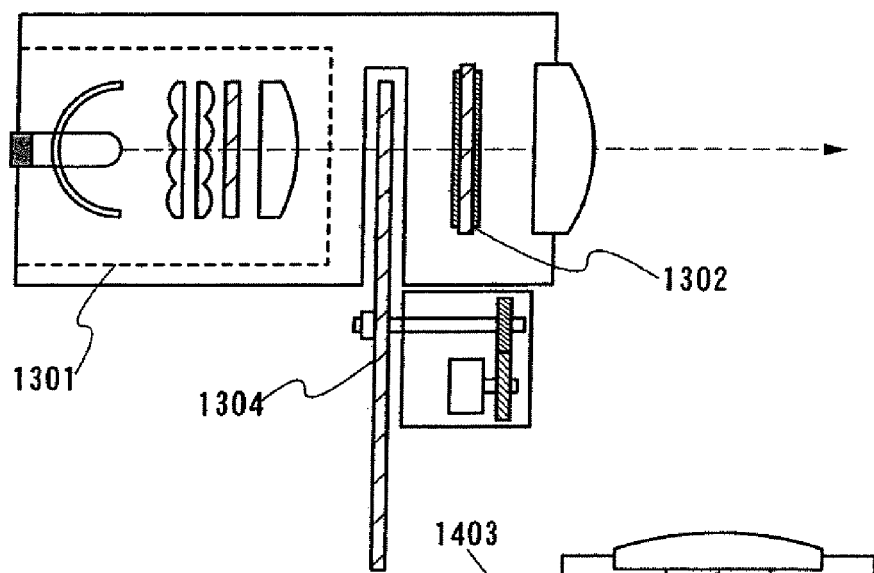
Figure 11C:
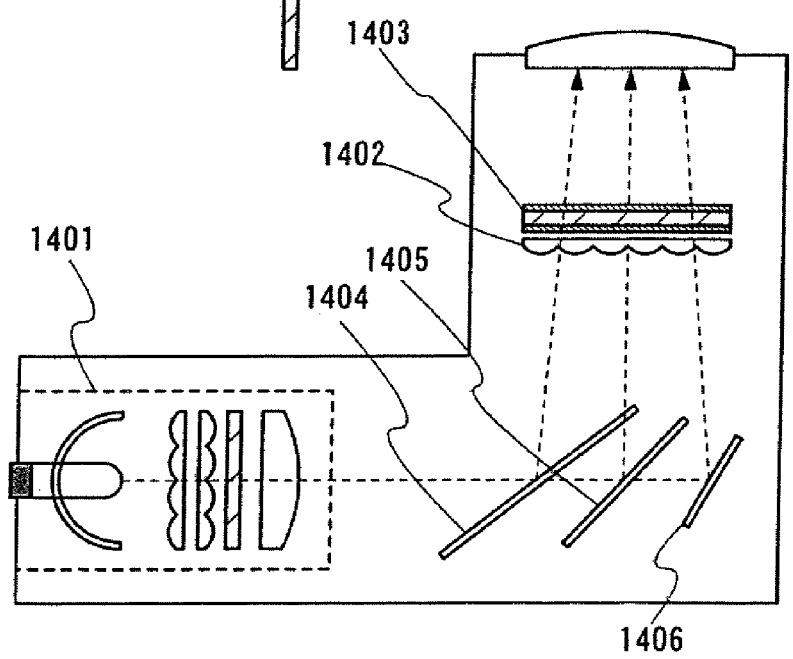
Figure 12:
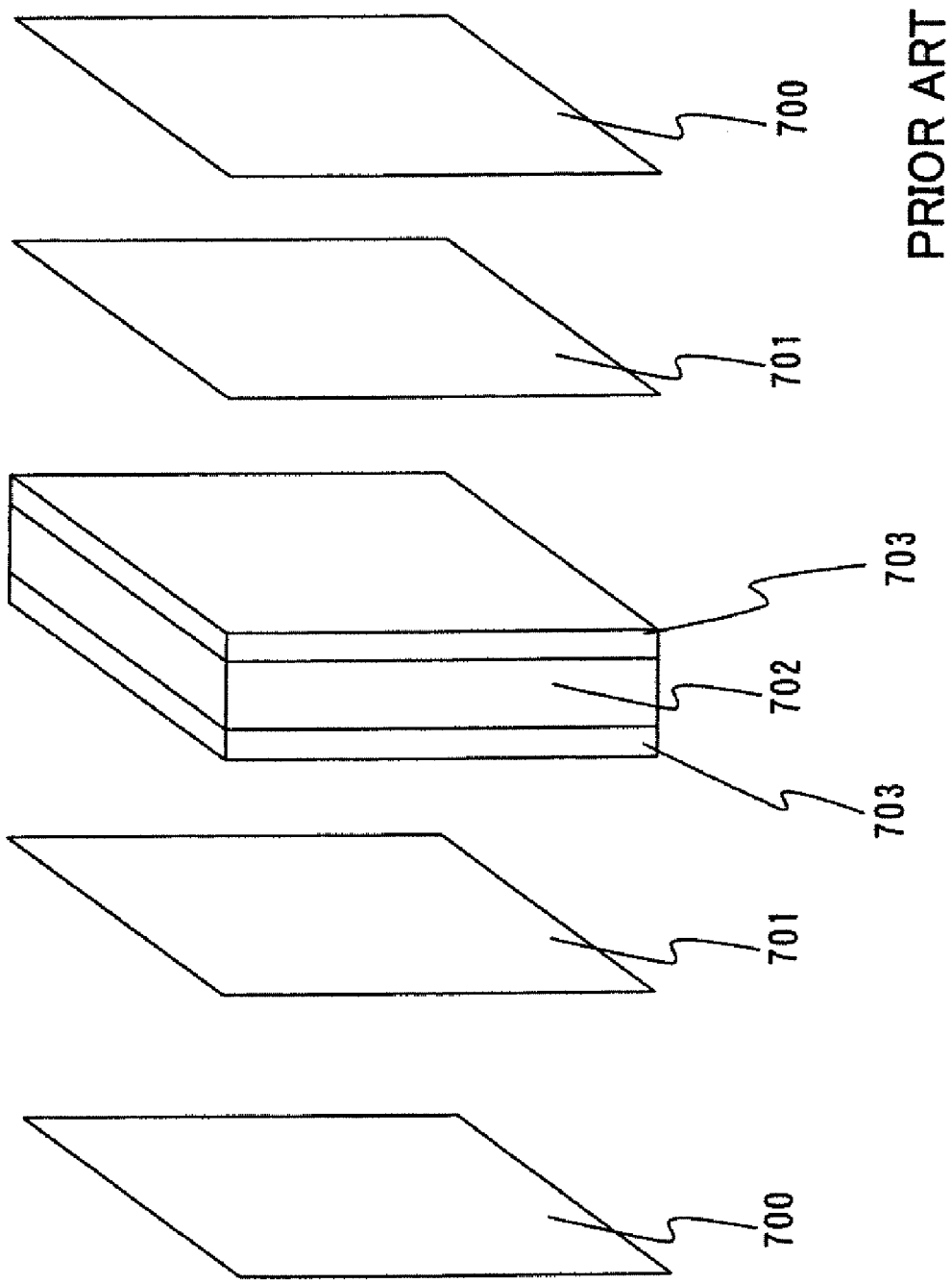
FIG. 12 is a diagram illustrating a structure of a conventional liquid crystal display device.

Projector units shown in FIGS. 11A to 11C have a single-plate structure. The projector unit shown in FIG. 11A includes a light source unit 1101, a liquid crystal display device 1102 and a projection optical system 1103. The projection optical system 1103 is composed of one or a plurality of lenses. The liquid crystal display device 1102 is provided with a color filter.

FIG. 11B shows the structure of a projector unit which operates in a field sequential mode. The field sequential mode is a mode in which light of each color such as red, green and blue is made go into a liquid crystal display device sequentially with a time lag, and color display is conducted without a color filter. In particular, when the field sequential mode and a fast-response liquid crystal display device are combined, high-definition images can be displayed. In FIG. 11B, a rotary color filter plate 1304 provided with a plurality of color filters for red, green and blue is provided between a light source unit 1301 and a liquid crystal display device 1302. In this case, no color filter is provided inside the liquid crystal display device 1302.

A projector unit shown in FIG. 11C has a structure of a color separation system that uses a micro lens as a color display system. In this system, a micro lens 1402 is provided on a light incidence side of a liquid crystal display device 1403, and light of each color is illuminated from each direction to accomplish color display. In this case, no color filter is provided inside the liquid crystal display device 1403. In a projector unit that employs this system, no light is lost due to a color filter, and thus, the projector unit has a feature that light from the light source unit 1401 can be used effectively. The projector unit includes a dichroic mirror 1404, a dicroic mirror 1405 and a dichroic mirror for R 1406 so that light of each color is illuminated from each direction to the liquid crystal display device 1403.

Since a phase difference film can be provided between an electrode and a liquid crystal in the liquid crystal display device according to the present invention, a liquid crystal display device can be more easily made thinner and more lightweight than conventionally. Therefore, also as for a display device that is provided with a single-plate projector unit, an inexpensive display device that is made thinner and more lightweight can be provided.

Although the present invention has been fully described by way of embodiment modes with reference to the accompanying drawings, it is to be understood that various changes and modifications will be apparent to those skilled in the art. Therefore, unless otherwise such changes and modifications depart from the scope of the present invention hereinafter described, they should be construed as being included therein.

This application is base on Japanese Patent Application serial no. 2004-315892 filed in Japanese Patent Office on Oct. 29, 2004, the contents of which are hereby incorporated by reference.

What is claimed is:

1. A liquid crystal display comprising:
   a first substrate;
   a first electrode over the first substrate;
   a layer over and in contact with the first electrode, the layer comprising a resin, a liquid crystal, a chiral agent, and a conductive material;
   a second electrode over the layer; and
   a second substrate over the second electrode,
   wherein the resin, the liquid crystal, the chiral agent, and the conductive material are mixed in the layer.

2. The liquid crystal display according to claim 1,
   wherein the liquid crystal is selected from a nematic liquid crystal, a ferroelectric liquid crystal, and an antiferroelectric liquid crystal.

3. The liquid crystal display according to claim 1,
   wherein the resin is an acrylic resin.

4. The liquid crystal display according to claim 1,
   wherein the weight percent of the liquid crystal in the layer is less than 50%.

5. The liquid crystal display according to claim 1, further comprising a second layer over the layer,
   wherein the second layer comprises the liquid crystal.

6. The liquid crystal display according to claim 1, further comprising a second liquid crystal over the layer.

7. The liquid crystal display according to claim 1,
   wherein the liquid crystal is in contact with the first electrode.

8. The liquid crystal display according to claim 1,
   wherein the conductive material is a metallic particle.

9. A liquid crystal display comprising:
   a first substrate;
   a thin film transistor formed over the first substrate;
   a pixel electrode over the first substrate;
   an insulating film formed over the thin film transistor and an edge portion of the pixel electrode;
   a layer over and in contact with the pixel electrode and the insulating film, the layer comprising a resin, a liquid crystal, a chiral agent, and a conductive material;
   an opposed electrode over the layer; and
   a second substrate.

10. The liquid crystal display according to claim 9,
    wherein the liquid crystal is selected from a nematic liquid crystal, a ferroelectric liquid crystal, and an antiferroelectric liquid crystal.

11. The liquid crystal display according to claim 9,
    wherein the resin is an acrylic resin.

12. The liquid crystal display according to claim 9,
    wherein the weight percent of the liquid crystal in the layer is less than 50%.

13. The liquid crystal display according to claim 9, further comprising a second layer over the layer,
    wherein the second layer comprises the liquid crystal.

14. The liquid crystal display according to claim 9, further comprising a second liquid crystal over the layer.

15. The liquid crystal display according to claim 9,
    wherein the resin, the liquid crystal, and the chiral agent are mixed in the layer.

16. The liquid crystal display according to claim 9, wherein the conductive material is a metallic particle.

17. An electric device comprising a liquid crystal display, the liquid crystal display comprising:
   a first substrate;
   a thin film transistor formed over the first substrate;
   a pixel electrode over the first substrate;
   an insulating film formed over the thin film transistor and an edge portion of the pixel electrode;
   a layer over and in contact with the pixel electrode and the insulating film, the layer comprising a resin, a liquid crystal, a chiral agent, and a conductive material;
   an opposed electrode over the layer; and
   a second substrate.

18. The electric device according to claim 17, wherein the liquid crystal is selected from a nematic liquid crystal, a ferroelectric liquid crystal, and an antiferroelectric liquid crystal.

19. The electric device according to claim 17, wherein the resin is an acrylic resin.

20. The electric device according to claim 17, wherein the weight percent of the liquid crystal in the layer is less than 50%.

21. The electric device according to claim 17, further comprising a second layer over the layer, wherein the second layer comprises the liquid crystal.

22. The electric device according to claim 17, further comprising a second liquid crystal over the layer.

23. The electric device according to claim 17, wherein the resin, the liquid crystal, and the chiral agent are mixed in the layer.

24. The electric device according to claim 17, wherein the conductive material is a metallic particle.

25. A liquid crystal display comprising:
   a first substrate;
   a first electrode over the first substrate;
   a layer over and in contact with the first electrode, the layer comprising a resin, a liquid crystal, a chiral agent, and a conductive material; and
   a second substrate over the layer,
   wherein the resin, the liquid crystal, and the chiral agent are mixed in the layer.

26. The liquid crystal display according to claim 25, wherein the liquid crystal is selected from a nematic liquid crystal, a ferroelectric liquid crystal, and an antiferroelectric liquid crystal.

27. The liquid crystal display according to claim 25, wherein the resin is an acrylic resin.

28. The liquid crystal display according to claim 25, wherein the weight percent of the liquid crystal in the layer is less than 50%.

29. The liquid crystal display according to claim 25, wherein the conductive material is a metallic particle.

* * * * *